(12) United States Patent
Nuzzi

(10) Patent No.: US 10,839,435 B2
(45) Date of Patent: *Nov. 17, 2020

(54) ONLINE/OFFLINE PAYMENT SYSTEM

(71) Applicant: PAYPAL, INC., San Jose, CA (US)

(72) Inventor: Frank Anthony Nuzzi, Pflugerville, TX (US)

(73) Assignee: PayPal, Inc., San Jose, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 15/875,888

(22) Filed: Jan. 19, 2018

(65) Prior Publication Data

US 2018/0211294 A1    Jul. 26, 2018

Related U.S. Application Data

(63) Continuation of application No. 13/532,456, filed on Jun. 25, 2012, now Pat. No. 9,875,493.

(51) Int. Cl.
*G06Q 30/00* (2012.01)
*G06Q 30/06* (2012.01)
*G06Q 40/02* (2012.01)

(52) U.S. Cl.
CPC ............. *G06Q 30/06* (2013.01); *G06Q 40/02* (2013.01)

(58) Field of Classification Search
CPC ............... G06Q 30/0601–0645; G06Q 30/80
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2, 50, 79
See application file for complete search history.

(56) References Cited

U.S. PATENT DOCUMENTS

| | | |
|---|---|---|
| 8,135,624 B1 | 3/2012 | Ramalingam et al. |
| 9,875,493 B2 | 1/2018 | Nuzzi |
| 2009/0157518 A1 | 6/2009 | Bishop et al. |
| 2011/0153495 A1 | 6/2011 | Dixon et al. |
| 2012/0130796 A1 | 5/2012 | Busch |

(Continued)

OTHER PUBLICATIONS

Tsuruoka, Doug., "Chinese Web Site Aims to Be B2B Leader for U,S, Small Companies AliExpress Sees Growth Online exchange links businesses with low-cost suppliers from China," Inventor's Business Daily, A04, Jun. 4, 2010.*

(Continued)

*Primary Examiner* — Brandy A Zukanovich
(74) *Attorney, Agent, or Firm* — Haynes and Boone, LLP

(57) ABSTRACT

A method for receiving a payment includes receiving information for a transaction with a merchant over the network, wherein the transaction includes an incomplete online transaction associated with a user account. A location of a user device that is associated with the user account is then retrieved, and a payment location is determined that is within a predetermined distance of the location of the user device. The payment location is then sent over the network to the user device. The user of the user device may then go to the payment location to provide payment information offline to a payment location device (e.g., by presenting a payment card to the payment location device provider, providing cash, etc.). That payment information is then received over the network from the payment location device and, in response, the online transaction is completed.

20 Claims, 8 Drawing Sheets

(56) References Cited

U.S. PATENT DOCUMENTS

2012/0158584 A1\* 6/2012 Behren .................. G06Q 20/10
705/41
2012/0191566 A1 7/2012 Sayan

OTHER PUBLICATIONS

Punj, Girish et al. "Cluster Analysis in Marketing Research: Review and Suggestions for Application," Journal of Marketing Research, vol. 20 May 1983.

\* cited by examiner

ONLINE/OFFLINE PAYMENT SYSTEM

CROSS-REFERENCE TO RELATED APPLICATIONS

This is a Continuation application to U.S. Utility application Ser. No. 13/532,456 filed Jun. 25, 2012, entitled "ONLINE/OFFLINE PAYMENT SYSTEM," the disclosure of which is incorporated herein by reference in its entirety.

BACKGROUND

Field of the Invention

The present disclosure generally relates to online and/or mobile payments and more particularly to a online/offline payment system.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

While online payments provide several of the benefits discussed above, they also involve some disadvantages. For example, some relatively large purchases may benefit from or even require (e.g., for security reasons) that a payer present a payment device in person in order to allow for the verification of the identity of the payer before accepting payment, and such purchases will not be appropriate using online payment methods. In another example, transaction fees associated with online payment methods may be higher than offline payment methods (e.g., credit account providers may charge a higher transaction fee to a payment service provider for a transaction involving an account number submitted online relative to a account number submitted using a physical payment device at a point of sale.) In yet another example, a payer may not have access to a network (e.g., the Internet) when they would like to make a payment, and thus will be unable to use the online payment methods discussed above to complete a transaction.

Thus, there is a need for an improved payment system.

SUMMARY

According to one embodiment, a method for receiving a payment includes receiving information for a transaction begun online with a merchant. A location of a user and/or user device may then be retrieved (e.g., from a user device associated with a user account used to begin the transaction with the merchant.) A payment location is determined using the location of the user and/or user device, and that payment location is sent to the user device. Payment information is then received from a payment location device at the payment location, and that payment information is used to complete the transaction that was begun online with the merchant.

In some embodiments, the payment location device may be unassociated with the merchant with whom the transaction was begun. Thus, the payment location device may be a device at a payment location where the payer may complete a transaction with a merchant that is located at a different location. In other embodiments, the payment location device may be associated with the merchant with whom the transaction was begun, and information for the transaction may be sent to the merchant that includes at least one product for purchase from the merchant and an identifier associated with the user account.

As a result, a user may begin a purchase online with a merchant and then complete the purchase offline at a payment location using a payment location device. In some embodiments, the system may be used to add a level of security to the transaction by allowing in-person identification of the user making the payment. Furthermore, the in-person payment may be associated with reduced transaction fees, and may be incentivized by providing the user with the products upon the presentation of a payment device to the merchant (e.g., to allow the user to test the products before purchasing.)

These and other features and advantages of the present disclosure will be more readily apparent from the detailed description of the embodiments set forth below taken in conjunction with the accompanying figures.

Figure 1:
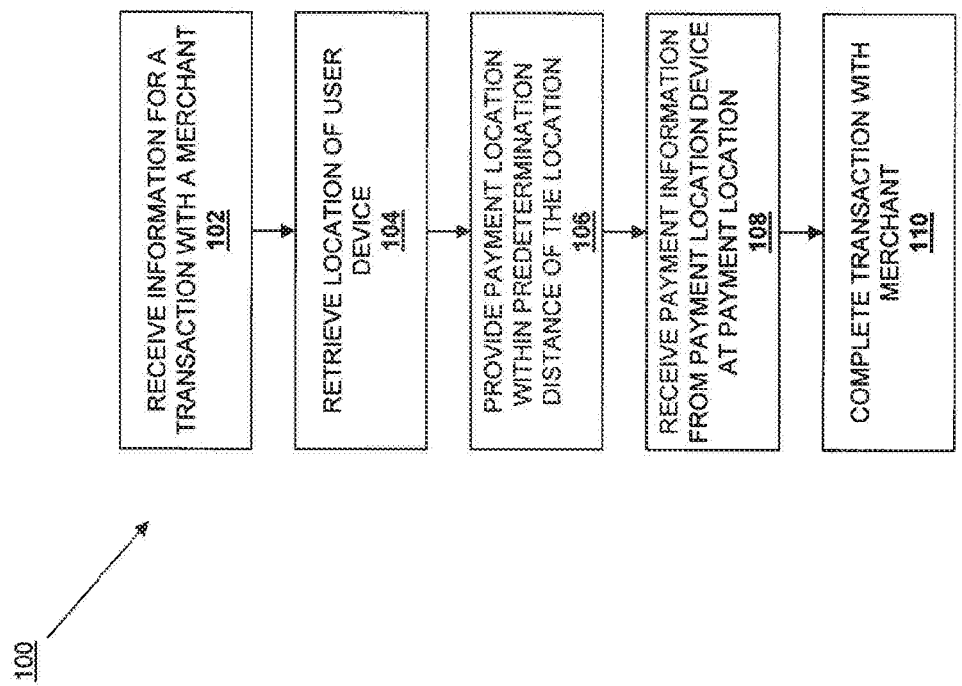
FIG. 1 is a flow chart illustrating an embodiment of a method for receiving a payment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for receiving payments for a transaction begun online with a merchant at a physical offline payment location. In some embodiments, a transaction with a merchant is begun online with a user device over a network, and information related to that transaction is received and associated with a user account. A location of the user device is then retrieved and used to determine a physical offline payment location that is within a predetermined distance of the user device, and that physical offline payment location is sent to the user device. Payment information is then received from a payment location device at the physical offline payment location, and that payment information is used to complete the transaction that was begun online with the merchant. The system and method allow a transaction begun online to be completed at a physical offline location, which may be used to provide security for the transaction (e.g., by allowing the identity of the user making the purchase to be verified), lower the costs associated with the transaction, provide for completion of the transaction when the user does not have access to a network, and/or provide a number of other benefits that would be recognized by one of skill in the art.

Referring now to FIG. 1, a method 100 for receiving payments is illustrated. In the embodiment of the method 100 described below, an account provider provides an user with a payment account, and the user may use the payment account to fund payments for purchases made from merchants. In another embodiment, a payment service provider such as, for example, PayPal, Inc. of San Jose, Calif., assists in the making of payments from the user to the merchant by transferring funds from the payment account of the user to a merchant account of the merchant. However, these embodiments are meant to be merely exemplary, and one of skill in the art will recognize that a variety of modifications may be made to the payment system discussed below without departing from the scope of the present disclosure.

The method 100 begins at block 102 where information for a transaction with a merchant is received. In an embodiment, a user may use a user device to begin an online transaction with a merchant over a network. For example, the user may use the user device to connect to the merchant device over the network and select one or more products and/or services, bid (e.g., provide a price they are willing to pay) for one or more products and/or services offered by the merchant, and/or conduct a variety of other preliminary purchasing actions known in the art. In addition, the user may use the user device to provide the merchant device with user information over the network such as, for example, a user name, a user identification number, a user account number, a user password, and/or a variety of other information known in the art for associating the user with the transaction. In some embodiments, the user may sign into an account with the merchant, an account provider, a payment service provider, and/or any other provider of the payment system before or during the transaction.

For example, at block 102, the user may begin an online transaction with a merchant and use the user device to select one or more products for purchase (e.g., the television illustrated in FIG. 2, discussed in further detail below, or the women's clothing illustrated in FIG. 3, discussed in further detail below), provide a bid on a product (e.g., the motorcycle illustrated in FIG. 4, discussed in further detail below), and/or otherwise provide purchasing information to the merchant device over the network. The user may also use the user device to provide the user information discussed above. In an embodiment, that user information may include payment account information (e.g., a credit card number) or may be associated with payment account information (e.g., a username and password for an account associated with a payment account). Thus, at block 102, the system provider device (which may be a merchant device operated by the merchant, an account provider device operated by an account provider, a payment service provider device operated by a payment service provider, and/or a third-party system provider device operated by a third-party system provider) receives information associated with a transaction with a merchant that includes purchase information describing the products and/or services selected by the user for purchase, and user information that is associated with a user account (e.g., a payment account or other account of the user). In some embodiments, the information associated with a transaction with a merchant may be received from the user device by a first device (e.g., a merchant device) that then forwards that information to a second device (e.g., a payment service provider device, another system provider device) over the network.

The method 100 then proceeds to block 104 where a location of the user and/or user device is retrieved. In an embodiment, the user device may include a location determination device (e.g., a Global Positioning System (GPS) device, a cell tower triangulation device, a wifi location determination device, and/or a variety of other location determination devices known in the art) to determine location data related to a current location of the user device. For example, the user device may be a mobile computing system that changes locations as the user moves, and at block 104 the user device may determine its current location. In some embodiments, the system provider device may retrieve location data determined by the mobile user device over the network. In an embodiment, the user device may look up the location of the user device in a database. For example, the user device may be a desktop computing system that is typically in one location, and the user may have provided location data associated with that location in the database. In some embodiments, the system provider device may retrieve the location data retrieved by the desktop user device over the network. In an embodiment, the system provider device may look up the location of the user device in a database. For example, the user may provide or have provided location data associated with their location (e.g., their home) to the system provider device. In an embodiment, the user may be prompted by the user device to provide their current location to the user device and in some embodiments the system provider device may retrieve that location from the user device over the network.

The method 100 then proceeds to block 106 where one or more payment locations are provided on the user device that are within a predetermined distance of the location retrieved in block 104. In an embodiment, the user device may access a payment location database that stores a plurality of payment locations and use the location data received in block 104 of the method 100 to determine whether any of those payment locations are within a predetermined distance of the location data. In another embodiment, the system provider device may access the payment location database that stores a plurality of payment locations and use the location data received in block 104 of the method 100 to determine whether any of those payment locations are within a predetermined distance of the location data. If any of the payment locations in the payment location database are within the predetermined distance of the location data, those payment locations may be provided on the user device. In an embodiment, the predetermined distance may be set, selected, and/or modified by the user using the user device or the system provider using the system provider device. Furthermore, the system provider device will also provide or make available to the payment location devices at each of the payment locations the information associated with the transaction that was started online (e.g., information about the products selected, user information related to a payment account or other account, etc.) over the network. A few examples of a user device displaying a plurality of payment locations after beginning a transaction with a merchant according to the method 100 are provided below, but such examples are not meant to be limiting, and one of skill in the art will recognize that a wide variety of combination and/or modification to the examples discussed below will fall within the scope of the present disclosure.

Figure 2:
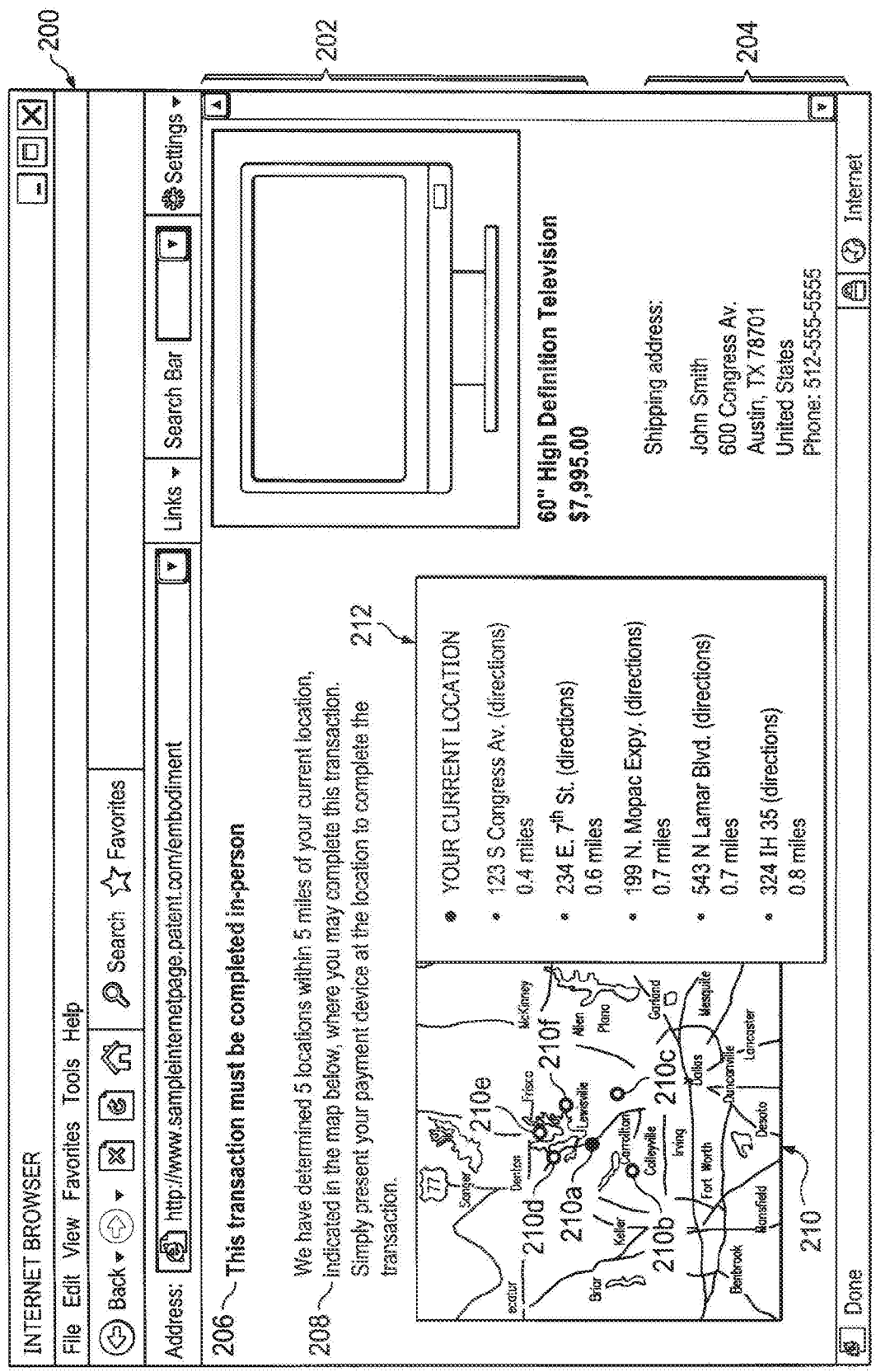
FIG. 2 is a screen shot illustrating an embodiment of a user device being used to display payment locations for completing a transaction offline.

Referring now to FIG. 2, an example of block 106 of the method 100 is illustrated. FIG. 2 illustrates a screen shot of a payment location page 200 provided on the user device. While one of skill in the art will recognize that the screen shot of FIG. 2 is illustrated as being provided by a website on a webpage through an internet browser that is typically provided on a desktop computer, the example illustrated in FIG. 2 is not intended to be limiting, and the information provided with the payment location page 200 may be provided in a variety of manners (through an application, as a message (e.g., a text message, a picture message, a "pop-up"), etc.) on a variety of devices (e.g., a mobile user device) without departing from the scope of the present disclosure.

The payment location page 200 includes a product information section 202 that, in the illustrated embodiment, displays one or more products (e.g., the 60" High Definition Television) that the user selected and that was provided as information for the transaction with the merchant at block 102 of the method 100. As can be seen in the product information section 202, information for the transaction with the merchant may include (or be used to retrieve) a picture of the product, a description of the product, a price of the product, and/or a variety of other product information known in the art. The payment location page 200 also includes a user information section 204 that, in the illustrated embodiment, displays user information (e.g., the shipping address of the user) that the user may have provided as information for the transaction with the merchant in block 102 of the method 100, or that may be related to the user information provided as information for the transaction with the merchant at block 102 of the method 100 (e.g., the user may have provided user account information, and the shipping address of the user may have been retrieved using that user account information.)

The payment location page 200 also includes a offline payment device presentation requirement alert 206 that indicates to the user that the user the transaction must be completed offline. In an embodiment, the user may have selected a product (e.g., the 60" High Definition Television in the illustrated embodiment) that includes a price (e.g., $7,995.00 in the illustrated embodiment) that exceeds a maximum amount that may be authorized for payment in an online transaction. For example, the account provider, the payment service provider, the merchant, or the user may set the maximum amount such that any amount exceeding the maximum amount will require the user to present a payment device at a physical offline payment location. This may be done for a variety of reasons such as, for example, so that the user may present further identification information along with the payment device that can be checked to ensure the user is a proper user of the payment account (e.g., the user may be required to submit photo identification along with the payment device such that a person at the payment location may check the photo identification against the user in-person to verify the users identity), so that the merchant may record the user (e.g., take a photo of the user) at the payment location and associate that photo with the payment, and/or a variety of other security reasons known in the art.

The payment location page 200 also includes a payment location information section 208 that informs the user that a plurality of payment locations have been determined that are within a predetermined distance of the user, and that the user must present a payment device at one of the plurality of payment locations in order to complete the transaction. The payment location page 200 also includes a map section 210 and associated map information section 212. The map section 210 includes a user location indicator 210*a* (corresponding to the location retrieved in block 104 of the method 100) along with a plurality of payment location indicators 210*b*, 210*c*, 210*d*, 210*e*, and 210*f* (corresponding to the payment locations retrieved in block 106 of the method 100). The associated map information section 212 includes information about the user location indicator 210*a* and the plurality of payment location indicators 210*b*, 210*c*, 210*d*, 210*e*, and 210*f* such as, for example, addresses for each of the payment locations associated with the payment location indicators 210*b*, 210*c*, 210*d*, 210*e*, and 210*f* along with links that the user may select to retrieve directions from the users current location to each of the payment locations associated with the payment location indicators 210*b*, 210*c*, 210*d*, 210*e*, and 210*f*. In one embodiment, the payment locations may be determined by the system provider device by determining the distance to each of a plurality of payment locations from the users current location (e.g., a driving distance, a walking distance, a public transportation distance, a biking distance, etc.) and then providing a predetermined number of the payment locations to the user device on the payment location page 200, providing any payment locations that are within a predetermined distance of the user location to the user device on the payment location page 200, etc.

Figure 3:
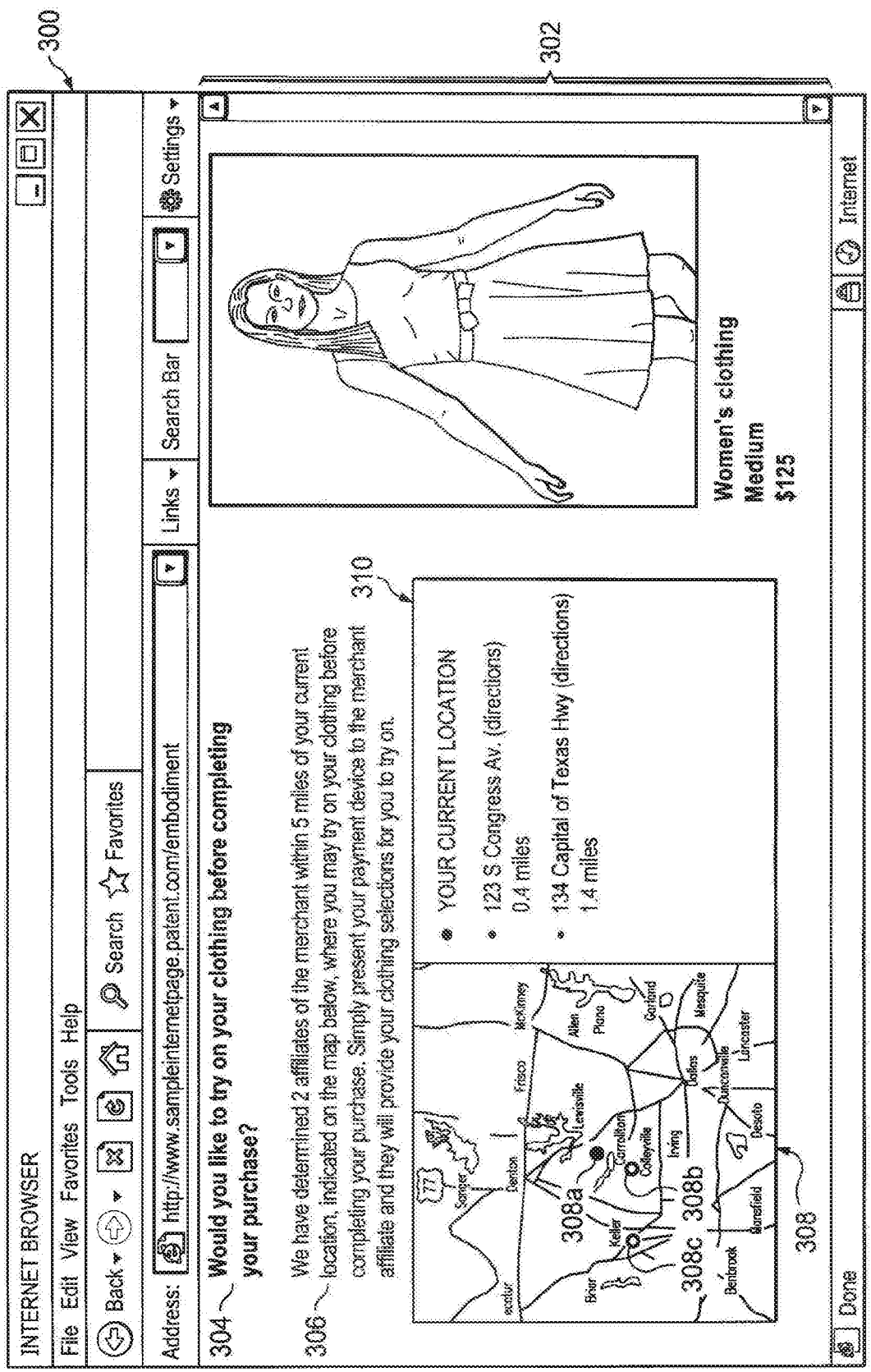
FIG. 3 is a screen shot illustrating an embodiment of a user device being used to display payment locations for completing a transaction offline.

Referring now to FIG. 3, another example of block 106 of the method 100 is illustrated. FIG. 3 illustrates a screen shot of a payment location page 300 provided on the user device. While one of skill in the art will recognize that the screen shot of FIG. 3 is illustrated as being provided by a website on a webpage through an internet browser that is typically provided on a desktop computer, the example illustrated in FIG. 3 is not intended to be limiting, and the information provided with the payment location page 300 may be provided in a variety of manners (through an application, as a message (e.g., a text message, a picture message, a "pop-up"), etc.) on a variety of devices (e.g., a mobile user device) without departing from the scope of the present disclosure.

The payment location page 300 includes a product information section 302 that, in the illustrated embodiment, displays one or more products (e.g., the women's clothing) that the user selected and that was provided as information for the transaction with the merchant at block 102 of the method 100. As can be seen in the product information section 302, information for the transaction with the merchant may include (or be used to the retrieve) a picture of the product, a description of the product, a price of the product, and/or a variety of other product information known in the art. While not illustrated, the payment location page 300 may also includes a user information section that displays user information that the user may have provided as information for the transaction or that may be related to the user information provided as information for the transaction with the merchant at block 102 of the method 100 (e.g., user account information.)

The payment location page 300 also includes a offline payment device presentation incentive alert 304 that may be provided as an attempt to incentivize the user to complete the transaction offline. As discussed above, in some embodiments, transaction fees associated with a purchase completed offline may be lower than transaction fees associated with a purchase completed online. Thus, the payment service provider or other system provider may save costs associated with the carrying out of the transaction if the user can be incentivized to complete the transaction offline. Thus, the payment device presentation incentive alert 304 of the illustrated embodiment includes an incentive that asks the user if they would like to try on the clothing that they have selected for purchase. In some embodiments, the system provider device may determine that the user has requested to pick up the products form the physical merchant location (e.g., an "in-store pickup), and may then provide the payment device presentation incentive alert 304 to suggest the user complete the transaction offline (e.g., upon picking up the product.) While a specific example of an incentive has been provided, other incentives may be provided to incentivize the user to complete the transaction offline such as, for example, a reduction in the price of the purchase (e.g., the system provider device may determine the difference in the transaction fees of the online purchase and offline purchase, and then offer the user some percentage of that difference to complete the transaction offline), a future credit for the merchant with whom the purchase is being conducted, and/or a variety of other incentives known in the art.

The payment location page 300 also includes a payment location information section 306 that informs the user that a plurality of payment locations, which are associated with the merchant from whom the product was selected, have been determined to be within a predetermined distance of the user, and that user may go to those locations to receive the incentive and present a payment device in order to complete the transaction. The payment location page 300 also includes a map section 308 and associated map information section 310. The map section 308 includes a user location indicator 308*a* (corresponding to the location retrieved in block 104 of the method 100) along with a plurality of payment location indicators 308*b* and 308*c* (corresponding to the payment locations retrieved in block 106 of the method 100). The associated map information section 310 includes information about the user location indicator 308*a* and the plurality of payment location indicators 308*b* and 308*c* such as, for example, addresses for each of the payment locations associated with the payment location indicators 308*b* and 308*c* along with links that the user may select to retrieve directions from the users current location to each of the payment locations associated with the payment location indicators 308*b* and 308*c*. In one embodiment, the payment locations may be determined by the system provider device by determining the distance from the users current location to each of a plurality of payment locations (e.g., a driving distance, a walking distance, a public transportation distance, a biking distance, etc.) that are associated with the merchant with whom the purchase is being conducted, determining if the products selected by the user are available at those payment locations, and then providing at least one payment location, which is associated with the merchant and that has the products selected by the user available, to the user device on the payment location page 200.

Figure 4:
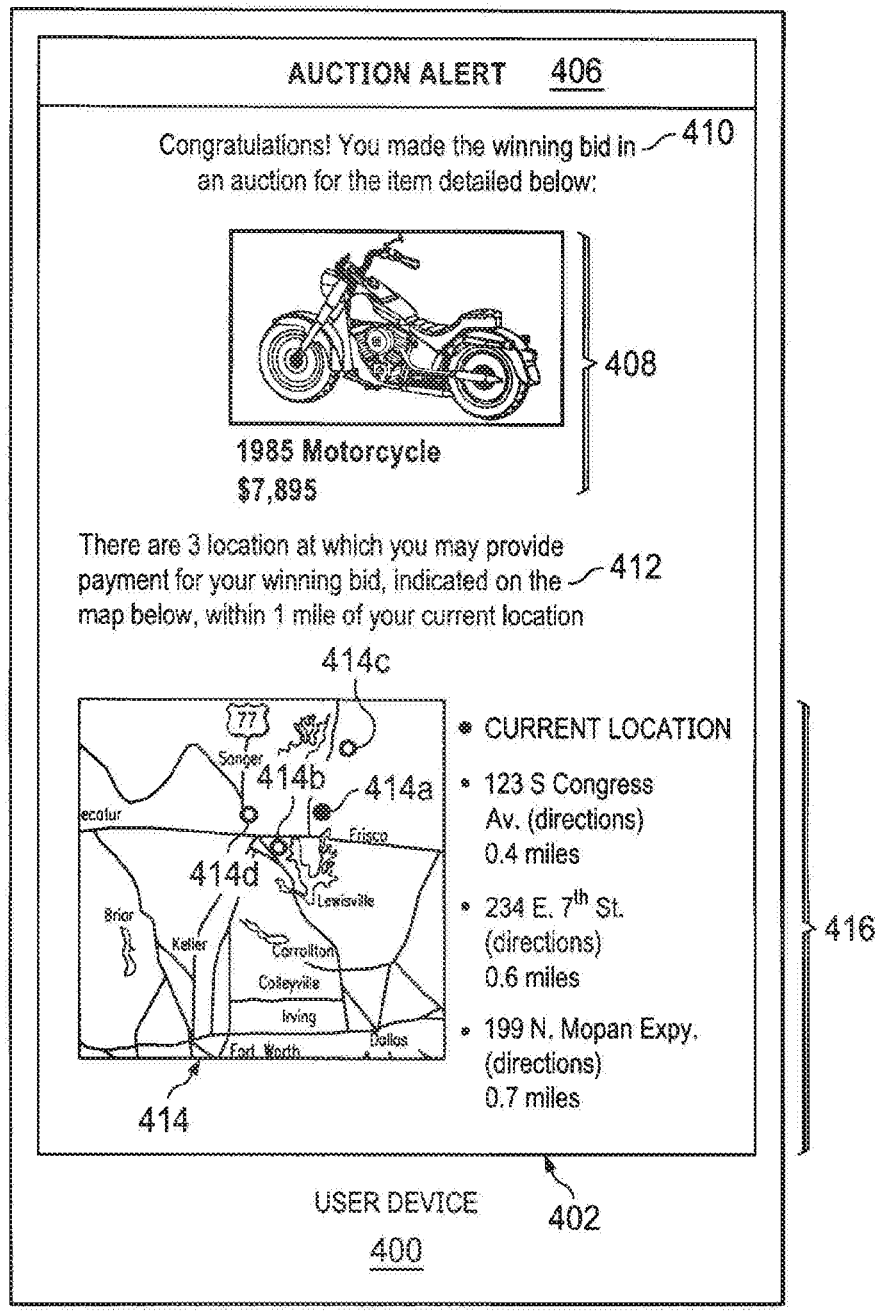
FIG. 4 is a screen shot illustrating an embodiment of a user device being used to display payment locations for completing a transaction offline.

Referring now to FIG. 4, another example of block 106 of the method 100 is illustrated. FIG. 4 illustrates a user device 400 that includes a display 402 displaying a payment location screen 406. While one of skill in the art will recognize that the screen shot of FIG. 4 is illustrated as being provided by a mobile computing device (e.g., as a web page, through an application, as a message (e.g., a text message, a picture message, a "pop-up"), etc.), the example illustrated in FIG. 4 is not intended to be limiting, and the information provided with the payment location screen 406 may be provided in a variety of manners on a variety of devices (e.g., a desktop user device) without departing from the scope of the present disclosure.

The payment location screen 406 includes a product information section 408 that, in the illustrated embodiment, displays one or more products (e.g., the 1985 Motorcycle) for which the user may have previously provided a bid and that was provided as information for the transaction with the merchant at block 102 of the method 100. As can be seen in the product information section 408, information for the transaction with the merchant may include a picture of the product, a description of the product, a price of the product, and/or a variety of other product information known in the art. While not illustrated, the payment location screen 406 may also includes a user information section that displays user information that the user may have provided as information for the transaction with the merchant or that may be related to the user information provided as information for the transaction with the merchant at block 102 of the method 100 (e.g., user account information.)

The payment location screen 406 also includes a product purchase alert 410 that informs the user that the bid provided on the product described in the product information section 408 was the winning bid. As discussed above, in some embodiments, transaction fees associated with a purchase completed offline may be lower than transaction fees associated with a purchase completed online. Thus, the payment service provider or other system provider may save money associated with the transaction if the user can be incentivized to complete the transaction offline. Thus, the payment location screen 406 of the illustrated embodiment may be provided to the user device 400 upon the user's bid winning the product as an incentive to the user to pay for the product offline. While a specific example of an incentive has been provided, other incentives may be provided to incentivize the user to complete the transaction offline such as, for example, a reduction in the price of the purchase (e.g., the system provider device may determine the difference in the transaction fees of the online purchase and offline purchase, and then offer the user some percentage of that difference to complete the transaction offline), a future credit for the merchant with whom the purchase is being conducted, and/or a variety of other incentives known in the art.

In other embodiments, the user may not have access to a network in order to complete a transaction with a merchant online. For example, the user may win the bid as discussed above with reference to FIG. 4, but then not be able to connect to a network in order to complete the transaction online. In such situations, the payment location screen 406 (or information associated with the payment location screen, discussed below) may be provided as a text message, a voice call, and/or using other communications means that do not necessitate the network for completing the transaction online.

The payment location screen 406 also includes a payment location information section 412 that informs the user that a plurality of payment locations have been determined that are within a predetermined distance of the user, and that user may present a payment device at one of the plurality of payment locations in order to complete the transaction. The payment location screen 406 also includes a map section 414 and associated map information section 416. The map section 414 includes a user location indicator 414*a* (corresponding to the location retrieved in block 104 of the method 100) along with a plurality of payment location indicators 414*b*, 414*c*, and 414*d* (corresponding to the payment locations retrieved in block 106 of the method 100). The associated map information section 416 includes information about the user location indicator 414*a* and the plurality of payment location indicators 414*b*, 414*c*, and 414*d* such as, for example, addresses for each of the payment locations associated with the payment location indicators 414*b*, 414*c*, and 414*d* along with links that the user may select to retrieve directions from the users current location to each of the payment locations associated with the payment location indicators 414*b*, 414*c*, and 414*d*. In one embodiment, the payment locations may be determined by the system provider device by determining the distance from the users current location to each of a plurality of payment locations (e.g., a driving distance, a walking distance, a public transportation distance, a biking distance, etc.) and then providing a predetermined number of the payment locations to the user device on the payment location screen 406, providing any payment locations that are within a predetermined distance of the user location to the user device on the payment location screen 406, etc.

The three examples above have been provided to illustrate how offline payment locations may be provided to a user to complete a transaction begun online with a merchant in order to, for example, provide additional security for the transaction, lower transaction fees associated with the transaction, and/or provide for a payment from a user who does not have access to a network to complete a transaction online. While the examples have included the purchase of products, the transaction may include the purchase of services and/or a variety of other purchases known in the art. Furthermore, the provision of offline payment locations to a user to complete a transaction begun with a merchant online may be done for reasons other than security, transaction cost savings, and/or lack of network access while still falling within the scope of the present disclosure.

Referring now to FIG. 1, the method 100 then proceeds to block 108 where payment information is received from a payment location device at a payment location. Following block 106, the user may travel to one the payment locations provided in block 106. As discussed above, each of the payment locations may include a payment location device that is operated by a merchant with whom the transaction is being conducted, a merchant in the payment system network that is unassociated with the transaction being conducted, and/or any other payment location device provider in the payment system network that is unassociated with the transaction being conducted. Once at the payment location, the user may present a payment device to provide payment information. For example, the user may present a credit card, a debit card, the user device, and/or a variety of other payment devices known in the art to a payment location device at the payment location.

The payment location device will receive payment account information from the payment device and use that payment account information to determine whether the payment account information is associated with a uncompleted transaction with a merchant that was started online. For example, the system provider device may have provided the payment location device at the payment location the information for the transaction started with the merchant online upon providing the payment location to the user device at block 106 of the method 100, and the payment location device may determine that the payment account information received from the payment device is associated with that transaction. In another example, payment location device at the payment location may use the payment account information to retrieve the information for the transaction started with the merchant online over the network from the system provider device. In some embodiments (e.g., the embodiment illustrated in FIG. 2), the operator of the payment location device may require the user to present photo identification or some other identification in order to verify the users identity to purchase the product. In some embodiments (e.g., the embodiment illustrated in FIG. 3), the payment location device is operated by the merchant with whom the transaction is being conducted, and the payment account information is used to retrieve the information for the transaction that includes one or more products selected by the user online, and those products may be provided to the user (e.g., to try on the clothing products illustrated in FIG. 3). Upon receiving the payment account information at block 108, the payment location device sends the payment account information over the network to the system provider device.

The method 100 then proceeds to block 110 where the transaction with the merchant is completed. Upon receiving the payment information from the payment location device at block 108 of the method 100, the system provider device may use the payment information to complete the transaction by transferring funds from a payment account of the user to a merchant account of the merchant with whom the transaction is being conducted, thus completing the transaction.

Thus, a system and method for receiving a payment is provided that allow a user to begin a purchase online and then complete the purchase offline. The user begins the purchase online with a merchant by selecting products and/or service from the merchant. At some point before the purchase is completed, the user is provided one or more offline payment locations at which to complete the purchase, and those payment location may be associated or unassociated with the merchant with whom the purchase is being conducted. The user then provides a payment device to a payment location device at one of the offline payment locations in order to complete the transaction. Such systems and methods may provide for increased security, lower transaction costs, payments by users without network access, and/or a variety of other benefits.

Figure 5:
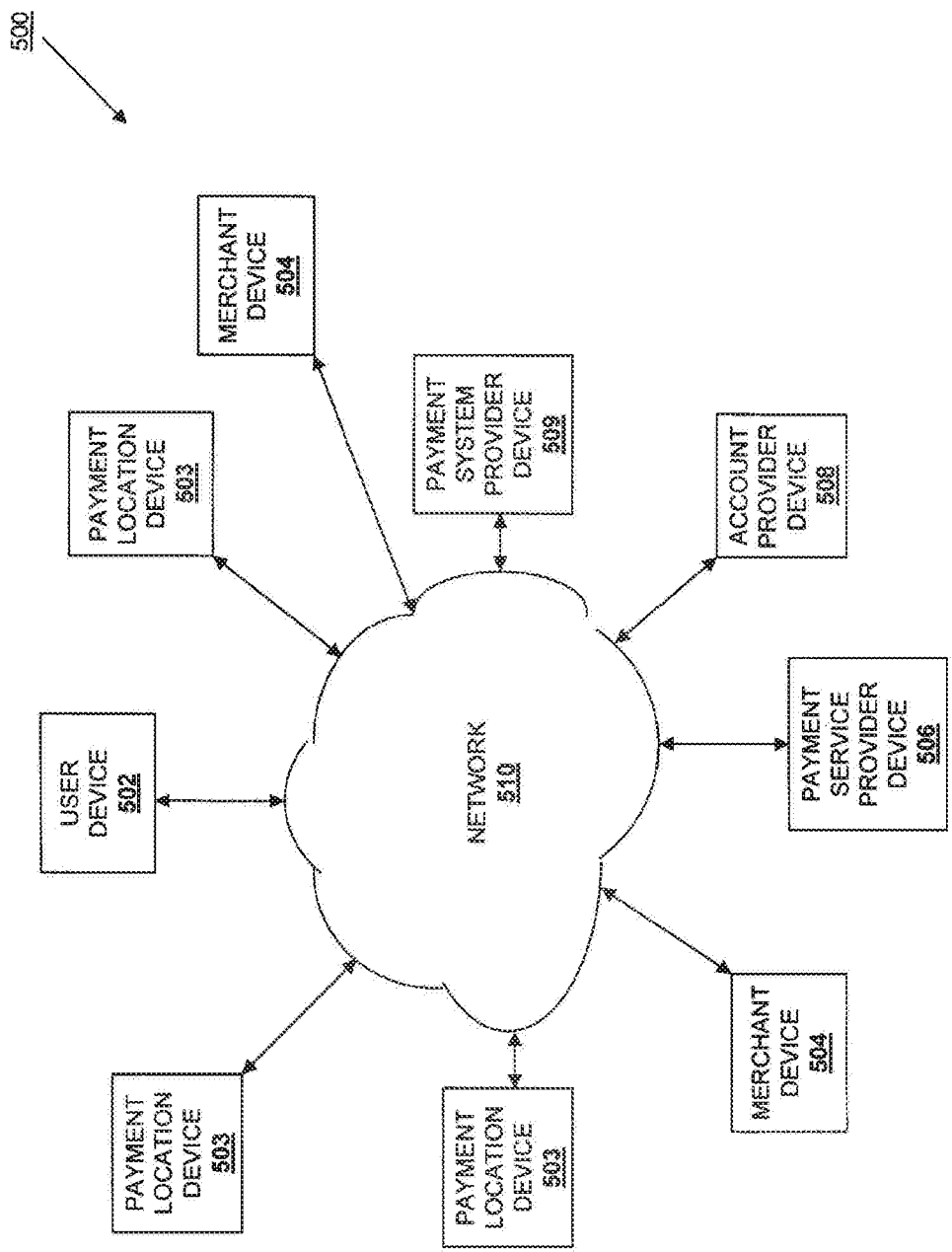
FIG. 5 is a schematic view illustrating an embodiment of a networked system.

Referring now to FIG. 5, an embodiment of a networked system 500 used in the payment system described above is illustrated. The networked system 500 includes a plurality of user devices 502, a plurality of payment location devices 502, a plurality of merchant devices 504, a payment service provider device 506, an account provider device 508, and/or a payment system provider device 509 in communication over a network 510. Any of the user devices 502 may be the user devices (e.g., the user device 400) discussed above. The payment location devices 503 may be the payment location devices discussed above and may be operated by the payment location device providers discussed above. The merchant devices 504 may be the merchant devices discussed above and may be operated by the merchants discussed above. The payment service provider device 506 may be the payment service provider devices discussed above and may be operated by a payment service provider such as, for example, PayPal Inc. of San Jose, Calif. The account provider device 508 may be the account provider device discussed above and may be operated by the account providers discussed above such as, for example, credit card account providers, bank account providers, savings account providers, and a variety of other account providers known in the art.

The user devices 502, payment location devices 503, merchant devices 504, payment service provider device 506, account provider device 508, and/or payment system provider device 509 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 500, and/or accessible over the network 510.

The network 510 may be implemented as a single network or a combination of multiple networks. For example, in various embodiments, the network 510 may include the Internet and/or one or more intranets, landline networks, wireless networks, and/or other appropriate types of networks.

The user device 502 may be implemented using any appropriate combination of hardware and/or software configured for wired and/or wireless communication over network 510. For example, in one embodiment, the user device 502 may be implemented as a personal computer of a user in communication with the Internet. In other embodiments, the user device 502 may be a smart phone, personal digital assistant (PDA), laptop computer, tablet computer, and/or other types of computing devices.

The user device 502 may include one or more browser applications which may be used, for example, to provide a convenient interface to permit the payer to browse information available over the network 510. For example, in one embodiment, the browser application may be implemented as a web browser configured to view information available over the Internet.

The user device 502 may also include one or more toolbar applications which may be used, for example, to provide user-side processing for performing desired tasks in response to operations selected by the user. In one embodiment, the toolbar application may display a user interface in connection with the browser application.

The user device 502 may further include other applications as may be desired in particular embodiments to provide desired features to the user device 502. In particular, the other applications may include a payment application for payments assisted by a payment service provider through the payment service provider device 506. The other applications may also include security applications for implementing user-side security features, programmatic user applications for interfacing with appropriate application programming interfaces (APIs) over the network 510, or other types of applications. Email and/or text applications may also be included, which allow the user to send and receive emails and/or text messages through the network 510. The user device 502 includes one or more user and/or device identifiers which may be implemented, for example, as operating system registry entries, cookies associated with the browser application, identifiers associated with hardware of the user device 502, or other appropriate identifiers, such as a phone number. In one embodiment, the user identifier may be used by the payment location device 503, payment service provider device 506 and/or account provider device 508 to associate the user with a particular account as further described herein.

The merchant device 504 may be maintained, for example, by a conventional or on-line merchant, conventional or digital goods seller, individual seller, and/or application developer offering various products and/or services in exchange for payment to be received conventionally or over the network 510. In this regard, the merchant device 504 may include a database identifying available products and/or services (e.g., collectively referred to as items) which may be made available for viewing and purchase by the user.

The merchant device 504 also includes a checkout application which may be configured to facilitate the purchase of items by the user. The checkout application may be configured to accept payment information from the user through the user device 502, the account provider through the account provider device 508, and/or from the payment service provider through the payment service provider device 506 over the network 510.

Figure 6:
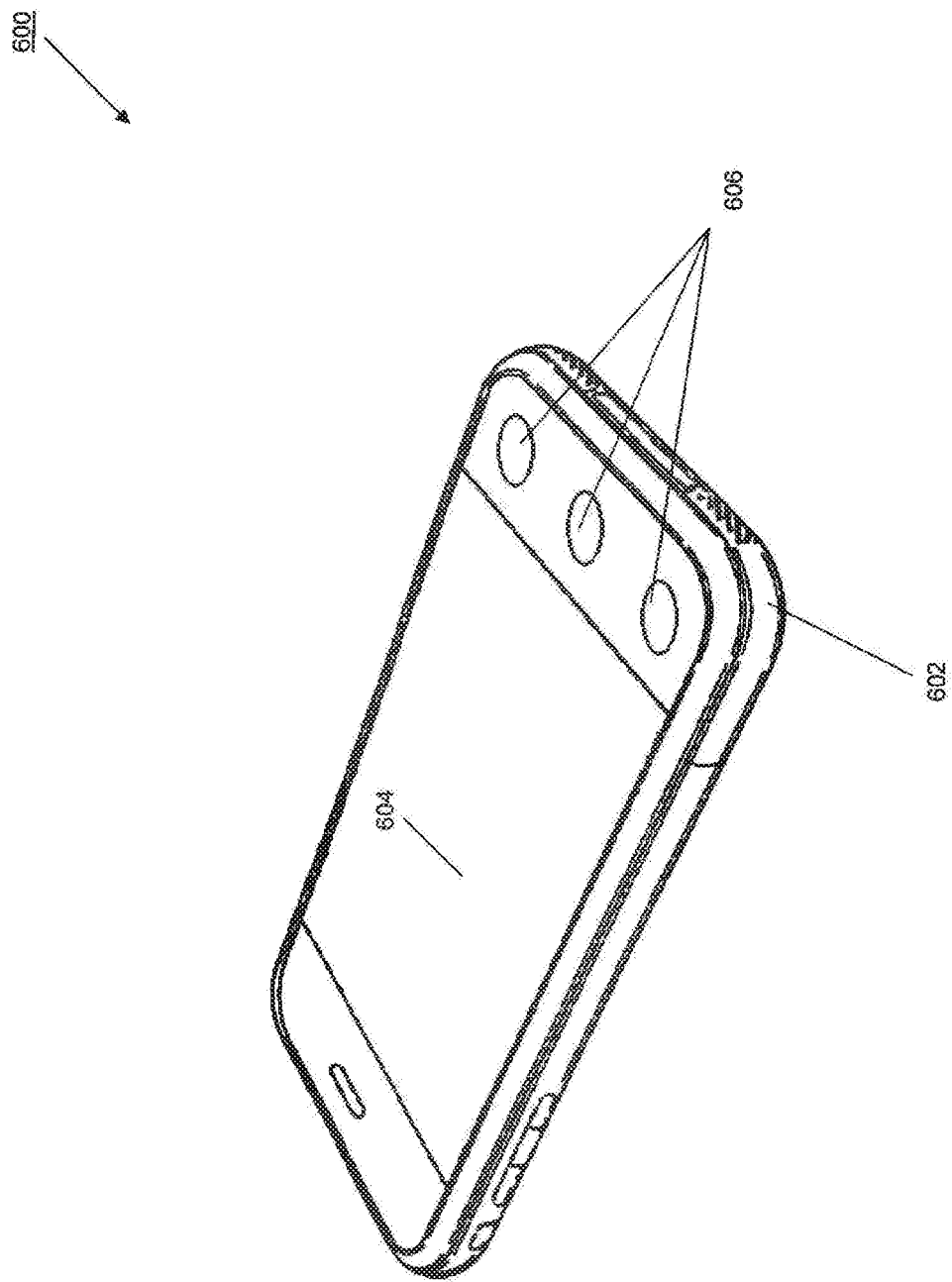
FIG. 6 is a perspective view illustrating an embodiment of a user device.

Referring now to FIG. 6, an embodiment of a user device 600 is illustrated. The user device 600 may be any of the user devices (e.g., the user devices 400 and/or 502). The user device 600 includes a chassis 602 having a display 604 and an input device including the display 604 and a plurality of input buttons 606. One of skill in the art will recognize that the user device 600 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 7:
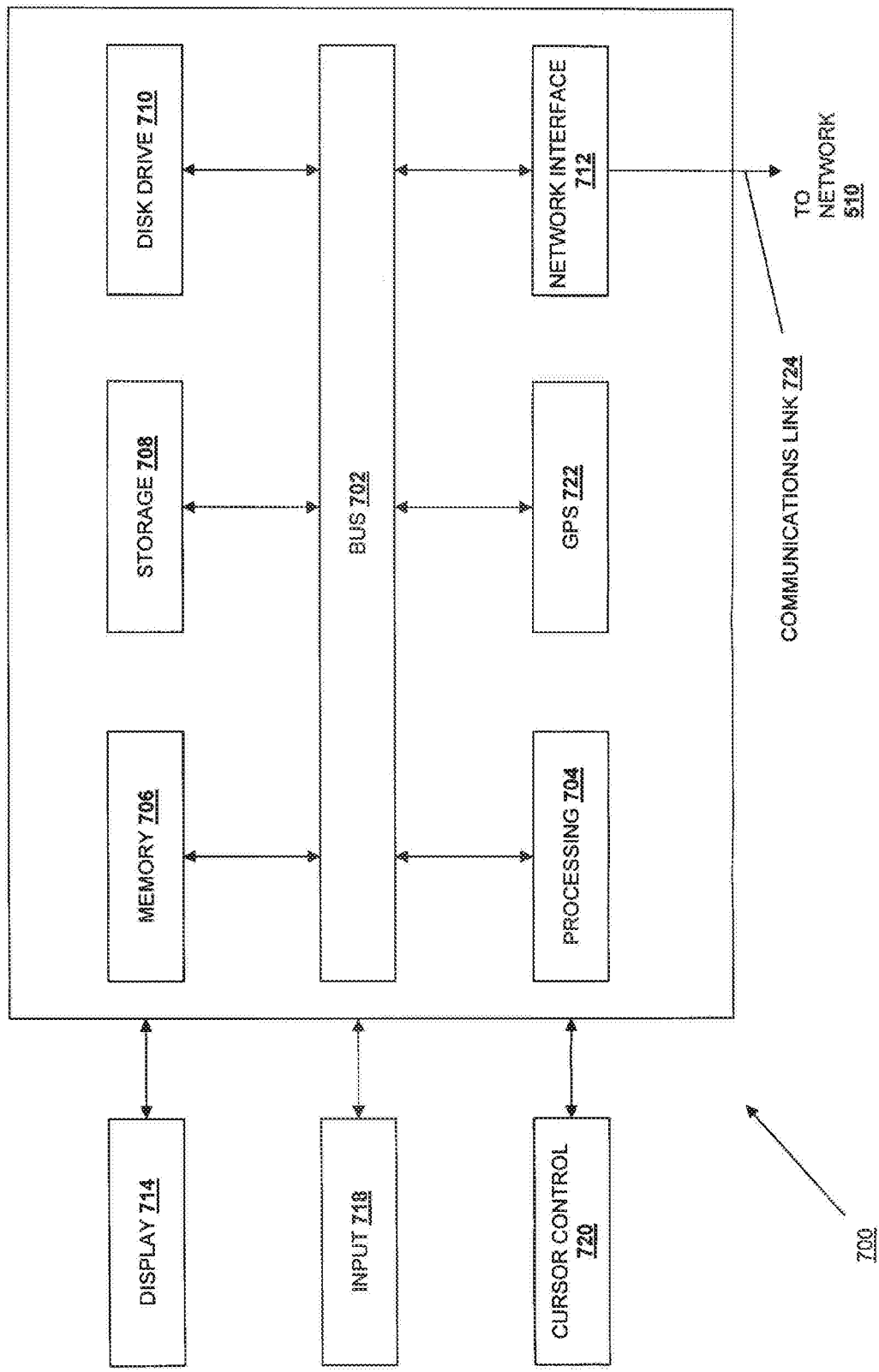
FIG. 7 is a schematic view illustrating an embodiment of a computer system.

Referring now to FIG. 7, an embodiment of a computer system 700 suitable for implementing, for example, the user device 400, the user device 502, the user device 600, the payment location devices 503, the merchant devices 504, the payment service provider device 506, the account provider device 508, and/or the payment system provider device 509, is illustrated. It should be appreciated that other devices utilized by users, merchants, payment location providers, payment service providers, and account providers in the payment system discussed above may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), and/or a location determination component 722 (e.g., a Global Positioning System (GPS) device as illustrated, a cell tower triangulation device, and/or a variety of other location determination devices known in the art.) In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the user device 400, 502, and 600, the payment location devices 503, the merchant device 504, the payment service provider device 506, the account provider device 508, and/or the payment system provider device 509. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In many embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 700. In various other embodiments of the present disclosure, a plurality of the computer systems 700 coupled by a communication link 724 to the network 510 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Figure 8:
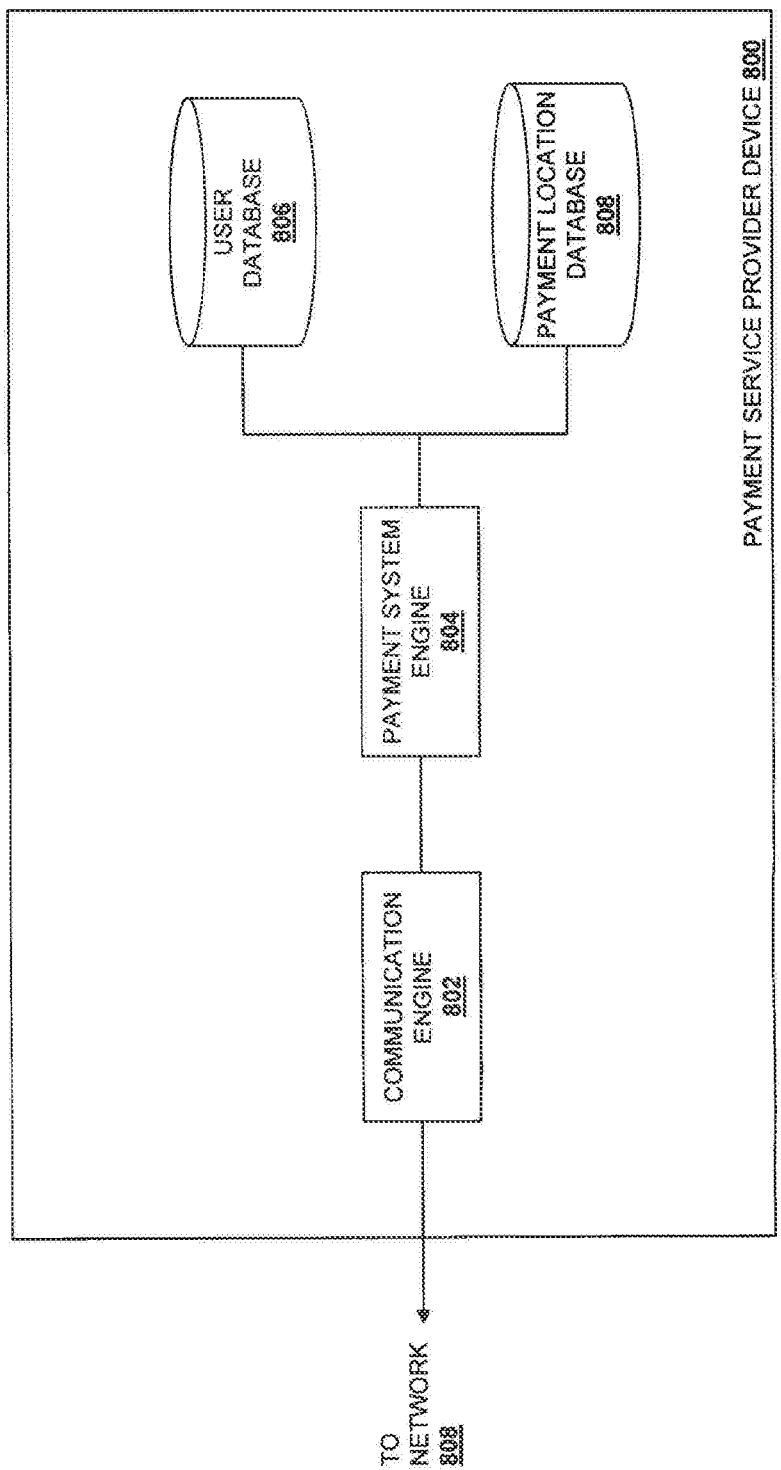
FIG. 8 is a schematic view illustrating an embodiment of a payment system provider device.

Referring now to FIG. 8, an embodiment of a payment system provider device 800 is illustrated. In an embodiment, the device 800 may include the user device 400, 502, and/or 600, the payment location devices 503, the merchants devices 504, the payment service provider device 506, the account holder device 508, and/or the payment system provider device 509. The device 800 includes a communication engine 802 that is coupled to the network 510 and to a payment system engine 804 that is coupled to a user database 806 and a payment location database 808. The communication engine 802 may be software or instructions stored on a computer-readable medium that allows the device 800 to send and receive information over the network 510. The payment system engine 804 may be software or instructions stored on a computer-readable medium that allows the device 800 to receive information for a transaction with a merchant, retrieve a location of a user device, provide payment locations on the user device, receive payment information from a payment location device, complete a transaction with a merchant, and provide any of the other functionality that is discussed above. While the databases 806 and 808 have been illustrated as located in the device 800, one of skill in the art will recognize that they may be connected to the payment system engine 804 through the network 510 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and merchants; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A payment system, comprising:
a non-transitory memory; and
one or more hardware processors coupled to the non-transitory memory and configured to execute instructions from the non-transitory memory to cause the system to perform operations comprising:
    receiving, through a network, information for an incomplete electronically-initiated transaction that identifies a user and a merchant conducting the incomplete electronically-initiated transaction;
    determining at least one electronically-initiated transaction characteristic for the incomplete electronically-initiated transaction;
    determining, based on the at least one electronically-initiated transaction characteristic for the incomplete electronically-initiated transaction, a first physical merchant location that is associated with the merchant that is conducting the incomplete electronically-initiated transaction and that is within a predetermined distance of a user location that is associated with the user conducting the incomplete electronically-initiated transaction;

sending, through the network to a physical merchant device that is located at the first physical merchant location and that was not utilized in the incomplete electronically-initiated transaction, the information for the incomplete electronically-initiated transaction;

receiving, through the network from the physical merchant device, user payment information that identifies the user; and completing the incomplete electronically-initiated transaction between the user and the merchant using the user payment information received from the physical merchant device.

2. The payment system of claim 1, wherein the at least one electronically-initiated transaction characteristic determined for the incomplete electronically-initiated transaction includes a transaction security characteristic, and wherein the operations further comprise:

identifying, through the network to a user device that is associated with the user, the first physical merchant location; and receiving, through the network from the physical merchant device, transaction security information that is associated with the user;

wherein the completing further uses the transaction security information received from the physical merchant device.

3. The payment system of claim 1, wherein the at least one electronically-initiated transaction characteristic determined for the incomplete electronically-initiated transaction includes a transaction fee characteristic, and wherein the operations further comprise:

identifying, through the network to a user device that is associated with the user, the first physical merchant location;

wherein a first transaction fee for completing the incomplete electronically-initiated transaction using the user payment information received from the physical merchant device is less than a second transaction fee associated with completing the incomplete electronically-initiated transaction online.

4. The payment system of claim 1, wherein the at least one electronically-initiated transaction characteristic determined for the incomplete electronically-initiated transaction includes a network unavailability characteristic, and wherein the operations further comprise:

identifying, in a database, the user location that was previously provided by the user and stored in the database.

5. The payment system of claim 1, wherein the operations further comprise:

retrieving, through the network from a user device that is associated with the user, the user location.

6. The payment system of claim 1, wherein the operations include:

determining, based on the at least one electronically-initiated transaction characteristic for the incomplete electronically-initiated transaction, a plurality of physical merchant locations that include the first physical merchant location, that are each associated with the merchant that is conducting the incomplete electronically-initiated transaction, and that are each within the predetermined distance of the user location that is associated with the user conducting the incomplete electronically-initiated transaction.

7. A method for making a payment, comprising:

receiving, by a system provider device through a network, information for an incomplete electronically-initiated transaction that identifies a user and a merchant conducting the incomplete electronically-initiated transaction;

determining, by the system provider device, that a user network connection to the user has become unavailable for completing the incomplete electronically-initiated transaction with the user online;

determining, by the system provider device in response to determining that the user network connection to the user has become unavailable for completing the incomplete electronically-initiated transaction with the user, a first physical merchant location that is associated with the merchant that is conducting the incomplete electronically-initiated transaction and that is within a predetermined distance of a user location that is associated with the user conducting the incomplete electronically-initiated transaction;

sending, by the system provider device through the network to a physical merchant device that is located at the first physical merchant location and that was not utilized in the incomplete electronically-initiated transaction, the information for the incomplete electronically-initiated transaction;

receiving, by the system provider device through the network from the physical merchant device, user payment information that identifies the user; and completing, by the system provider device, the incomplete electronically-initiated transaction between the user and the merchant using the user payment information received from the physical merchant device.

8. The method of claim 7, further comprising:

identifying, by the system provider device in a database, the user location that was previously provided by the user and stored in the database.

9. The method of claim 7, further comprising:

retrieving, by the system provider device through the network from a user device that is associated with the user and prior to determining that the user network connection to the user has become unavailable for completing the incomplete electronically-initiated transaction online, the user location.

10. The method of claim 7, further comprising:

determining, by the system provider device in response to determining that the user network connection to the user has become unavailable for completing the incomplete electronically-initiated transaction with the user online, a plurality of physical merchant locations that includes the first physical merchant location, that are each associated with the merchant that is conducting the incomplete electronically-initiated transaction, and that are each within the predetermined distance of the user location that is associated with the user conducting the incomplete electronically-initiated transaction.

11. The method of claim 10, further comprising sending, by the system provider device through the network to a physical merchant device that is located at a second physical merchant location that is included in the plurality of physical merchant locations and that was not utilized in the incomplete electronically-initiated transaction, the information for the incomplete electronically-initiated transaction.

12. The method of claim 7, further comprising:
identifying, without a use of the user network connection to the user that has become unavailable for completing the incomplete electronically-initiated transaction with the user online, the first physical merchant location to the user.

13. The method of claim 12, wherein the first physical merchant location is identified to the user in a text message transmitted by the system provider device to a mobile device that is associated with the user.

14. A non-transitory, machine-readable medium having stored thereon machine-readable instructions executable to cause a machine to perform operations comprising:
receiving, through a network, information for an incomplete electronically-initiated transaction that identifies a user and a merchant conducting the incomplete electronically-initiated transaction;
determining that the user is unavailable via the network for completing the incomplete electronically-initiated transaction online;
determining, in response to determining that the user is unavailable via the network for completing the incomplete electronically-initiated transaction online, a first physical merchant location that is associated with the merchant that is conducting the incomplete electronically-initiated transaction and that is within a predetermined distance of a user location that is associated with the user conducting the incomplete electronically-initiated transaction;
sending, through the network to a physical merchant device that is located at the first physical merchant location and that was not utilized in the incomplete electronically-initiated transaction, the information for the incomplete electronically-initiated transaction;
receiving, through the network from the physical merchant device, user payment information that identifies the user; and
completing the incomplete electronically-initiated transaction between the user and the merchant using the user payment information received from the physical merchant device.

15. The non-transitory, machine-readable medium of claim 14, wherein the operations further comprise:
identifying, in a database, the user location that was previously provided by the user and stored in the database.

16. The non-transitory, machine-readable medium of claim 14, wherein the operations further comprise:
retrieving, through the network from a user device that is associated with the user and prior to determining that the user is unavailable via the network for completing the incomplete electronically-initiated transaction online, the user location.

17. The non-transitory, machine-readable medium of claim 14, wherein the operations further comprise:
determining, in response to determining that the user is unavailable via the network for completing the incomplete electronically-initiated transaction online, a plurality of physical merchant locations that includes the first physical merchant location, that are each associated with the merchant that is conducting the incomplete electronically-initiated transaction, and that are each within the predetermined distance of the user location that is associated with the user conducting the incomplete electronically-initiated transaction.

18. The non-transitory, machine-readable medium of claim 17, wherein the operations further comprise:
sending, through the network to a physical merchant device that is located at a second physical merchant location that is included in the plurality of physical merchant locations and that was not utilized in the incomplete electronically-initiated transaction, the information for the incomplete electronically-initiated transaction.

19. The non-transitory, machine-readable medium of claim 14, wherein the operations further comprise:
identifying, without the use of the network that was used by the user to begin the incomplete electronically-initiated transaction online, the first physical merchant location to the user.

20. The non-transitory, machine-readable medium of claim 19, wherein the first physical merchant location is identified to the user in a text message transmitted to a mobile device that is associated with the user.

* * * * *